US009137086B1

(12) United States Patent
Naik (10) Patent No.: US 9,137,086 B1
(45) Date of Patent: Sep. 15, 2015

(54) SOCIAL MEDIA SESSION ACCESS (75) Inventor: Kiran Naik, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 159 days.

(21) Appl. No.: 13/300,499

(22) Filed: Nov. 18, 2011

Related U.S. Application Data

(60) Provisional application No. 61/527,527, filed on Aug. 25, 2011.

(51) Int. Cl.
*G06F 15/16* (2006.01)
*G06F 15/173* (2006.01)
*H04L 29/06* (2006.01)

(52) U.S. Cl.
CPC ................................. *H04L 29/0602* (2013.01)

(58) Field of Classification Search
CPC . G06F 19/322; G06F 17/30867; H04L 67/18; H04L 67/22; H04L 67/24; H04L 67/306
USPC ......... 709/203, 204, 205, 226, 206, 223, 224, 709/225, 228, 229; 707/722; 705/36 R; 700/91; 455/519; 370/260, 382, 352; 379/201.01; 345/522
See application file for complete search history.

(56) References Cited

U.S. PATENT DOCUMENTS

| | | | |
|---|---|---|---|
| 5,689,641 A | 11/1997 | Ludwig et al. | |
| 6,167,432 A | 12/2000 | Jiang | |
| 6,343,314 B1 | 1/2002 | Ludwig et al. | |
| 6,442,590 B1 | 8/2002 | Inala | |
| 6,608,636 B1 | 8/2003 | Roseman | |
| 7,028,073 B1 | 4/2006 | Bui et al. | |
| 7,383,345 B2 | 6/2008 | Cinghita et al. | |
| 7,460,493 B1* | 12/2008 | Dhanoa et al. | 709/204 |
| 7,539,732 B2 | 5/2009 | Kelso et al. | |
| 7,818,020 B1* | 10/2010 | Manroa et al. | 455/519 |
| 7,840,651 B2 | 11/2010 | Cinghita et al. | |
| 8,438,226 B2 | 5/2013 | Kilmer et al. | |
| 8,471,890 B1 | 6/2013 | Golas | |
| 8,700,714 B1 | 4/2014 | Pan et al. | |
| 8,788,680 B1 | 7/2014 | Naik | |
| 2003/0164853 A1 | 9/2003 | Zhu et al. | |
| 2003/0167304 A1 | 9/2003 | Zhu et al. | |
| 2004/0090959 A1 | 5/2004 | Cinghita et al. | |
| 2004/0111472 A1 | 6/2004 | Swanson et al. | |
| 2005/0021624 A1 | 1/2005 | Herf et al. | |
| 2005/0216847 A1 | 9/2005 | Zhu et al. | |

(Continued)

OTHER PUBLICATIONS

Davey Wavey Fitness, "Tonight: Davey Wavey Live for a Fitness-Themed Blog TV Show," published May 9, 2011, 11 pages. Internet site: http://www.daveywaveyfitness.com/tips/tonight-davey-wavey-live-for-a-fitness-themed-blogtv-show/.

(Continued)

*Primary Examiner* — Quang N Nguyen (57) ABSTRACT

A method for social media session access includes, by a computing device, receiving a user request to join a social media session. If the social media session has less than a predetermined quantity of current users, the user is granted access to the session. If the social media session has the predetermined quantity of current users, information about the user is stored user in a list of users waiting to join the session. As slots in the session become available, users are selected from the waitlist. An owner of the session may determine the criteria used in selecting from among multiple users in the waitlist.

21 Claims, 11 Drawing Sheets

(56) References Cited

U.S. PATENT DOCUMENTS

| | | | |
|---|---|---|---|
| 2006/0039367 A1* | 2/2006 | Wright et al. | 370/382 |
| 2006/0045029 A1 | 3/2006 | Ethier et al. | |
| 2006/0075029 A1 | 4/2006 | Kelso et al. | |
| 2007/0081647 A1 | 4/2007 | Baker | |
| 2007/0112918 A1 | 5/2007 | Berstis | |
| 2007/0165608 A1* | 7/2007 | Altberg et al. | 370/352 |
| 2007/0168511 A1 | 7/2007 | Brochu et al. | |
| 2007/0177604 A1 | 8/2007 | Ozawa et al. | |
| 2007/0201659 A1* | 8/2007 | Altberg et al. | 379/201.01 |
| 2007/0233291 A1* | 10/2007 | Herde et al. | 700/91 |
| 2007/0250566 A1 | 10/2007 | Appelman et al. | |
| 2008/0005657 A1 | 1/2008 | Sneh | |
| 2008/0056256 A1 | 3/2008 | Cinghita et al. | |
| 2008/0155087 A1 | 6/2008 | Blouin et al. | |
| 2008/0222533 A1 | 9/2008 | Hankejh et al. | |
| 2008/0260138 A1 | 10/2008 | Chen et al. | |
| 2009/0088880 A1 | 4/2009 | Thapa | |
| 2009/0089683 A1 | 4/2009 | Thapa | |
| 2009/0253410 A1 | 10/2009 | Fitzgerald et al. | |
| 2009/0280909 A1* | 11/2009 | McEniry | 463/42 |
| 2009/0325626 A1 | 12/2009 | Palanki et al. | |
| 2009/0327079 A1* | 12/2009 | Parker et al. | 709/226 |
| 2010/0046401 A1* | 2/2010 | Wright et al. | 370/260 |
| 2010/0088414 A1 | 4/2010 | Lin et al. | |
| 2010/0124321 A1 | 5/2010 | Alexandrov et al. | |
| 2010/0157017 A1 | 6/2010 | Pepperell | |
| 2010/0192072 A1 | 7/2010 | Spataro et al. | |
| 2010/0250678 A1 | 9/2010 | Hu et al. | |
| 2010/0332326 A1* | 12/2010 | Ishai | 705/14.58 |
| 2011/0066470 A1* | 3/2011 | Goyal et al. | 709/205 |
| 2011/0175923 A1* | 7/2011 | Mahajan et al. | 345/522 |
| 2011/0289157 A1 | 11/2011 | Pirnazar | |
| 2011/0302105 A1* | 12/2011 | Yakubov | 705/36 R |
| 2011/0314394 A1 | 12/2011 | Kilmer et al. | |
| 2012/0004940 A1 | 1/2012 | O'Sullivan et al. | |
| 2012/0078884 A1* | 3/2012 | Callari et al. | 707/722 |
| 2012/0084353 A1 | 4/2012 | Herde et al. | |
| 2012/0101865 A1* | 4/2012 | Zhakov | 705/7.13 |
| 2012/0144416 A1 | 6/2012 | Wetzer et al. | |
| 2013/0013778 A1 | 1/2013 | Herde et al. | |
| 2013/0066974 A1 | 3/2013 | Yoakum et al. | |
| 2013/0073389 A1 | 3/2013 | Heath | |
| 2013/0117359 A1 | 5/2013 | Husain et al. | |
| 2013/0152221 A1 | 6/2013 | Yin et al. | |
| 2013/0169742 A1 | 7/2013 | Wu et al. | |
| 2013/0179941 A1 | 7/2013 | McGloin et al. | |
| 2014/0006129 A1 | 1/2014 | Heath | |

OTHER PUBLICATIONS

Levitt, J., "Fun with Amazon's Simple Queue Service," O'Reilly xml.com, Jan. 5, 2005, 9 pages. Internet site: http://www.xml.com/pub/a/2005/01/05/sqs.html?page=2.

TJN Chat Room—The Jazz Network Worldwide, found at http://www.thejazznetworkworldwide.comigrouptjnchatroonn, accessed on Dec. 5, 2011, 15 pp.

Stackoverflow, Implementing an Online Waiting Room, httplistackoverflow.conniquestionst2669891/implementing-an-online-waiting-room, Apr. 19, 2010, 2 pp.

Notice of Allowance, dated Mar. 12, 2014, for related U.S. Appl. No. 13/360,968.

Final Rejection, dated Dec. 18, 2013, for related U.S. Appl. No. 13/360,968.

Non-Final Rejection, dated Jul. 12, 2013, for related U.S. Appl. No. 13/360,968.

Notice of Allowance, dated Apr. 22, 2015, for U.S. Appl. No. 14/317,213.

\* cited by examiner

| UserID | Notify Preference | Display Preference | List ID | List Position | Online Activity | Celebrity Status | Friends | Followers | Policy Violations | Geo-location | Purchase History | Ad View History |
|---|---|---|---|---|---|---|---|---|---|---|---|---|
| UserID #1 | ⋮ | ⋮ | ⋮ | ⋮ | ⋮ | ⋮ | ⋮ | ⋮ | ⋮ | ⋮ | ⋮ | ⋮ |
| UserID #2 | ⋮ | ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ | ⋮ |
| UserID #U | ⋮ | ⋮ | ⋮ | ⋮ | ⋮ | ⋮ | ⋮ | ⋮ | ⋮ | ⋮ | ⋮ | ⋮ |

FIG. 8

| ListID | Owner | SessionID | Wait List | Status |
|---|---|---|---|---|
| ListID #1 | ... | ... | ... | ... |
| ListID #2 | ... | ... | ... | ... |
| ... | | | | |
| ListID #U | ... | ... | ... | ... |

SOCIAL MEDIA SESSION ACCESS

CROSS REFERENCE TO RELATED APPLICATIONS

This application claims the benefit of the following provisional patent application, the disclosure of which is incorporated herein in its entirety by reference:

U.S. Provisional Patent Application No. 61/527,527 filed Aug. 25, 2011, entitled "Social Media Session Access."

TECHNICAL FIELD

Aspects of the present disclosure relate to social media session access.

BACKGROUND

A social network can be an online system that provides a forum for geographically separated users to interact with one another, where those users have defined a relationship between one another. Users can control who can view their information by identifying particular relationships with other users, and can also find new friends from the group of other people who are "friends" of their own friends. Social networks can be aimed at different types of social interaction, such as friendship and business networking. A user of a social network can have a profile page (e.g., a web page on the social network) that provides information about the user to other users of the social network. A profile can include information regarding a user's acquaintance relationships (e.g., friends, colleagues, schoolmates, etc.) on the social network.

Social network systems may allow users to join virtual meetings or sessions whereby the users can hear each other, send text messages to each other, and possibly see each other interact during the sessions. Due to network and computing device resource constraints, such social network systems typically limit the quantity of simultaneous session participants to assure at least a minimum level of performance. If a user asks to join a session that presently has the maximum quantity of simultaneous participants, the user is simply informed that the session is full. The user is free to repeatedly ask to join the session, but will only be granted access when one or more other users leave the session and the user's request is received before requests from other users wanting to join the same session. Accordingly, a need exists in the art for an improved solution for social media session access.

BRIEF DESCRIPTION OF THE DRAWINGS

The accompanying drawings, which are incorporated into and constitute a part of this specification, illustrate one or more embodiments and, together with the detailed description, serve to explain the principles and implementations of the present disclosure.

In the drawings:

FIG. 8 depicts a data structure for storing certain user information in accordance with some embodiments of the present disclosure.

DESCRIPTION OF EXAMPLE EMBODIMENTS

Overview

Example embodiments of the present disclosure provide a solution for social media session access wherein users requesting access to a social media session that is presently "full" are added to a waitlist. The term "social media session" as used herein encompasses its plain and ordinary meaning, including, but not limited to a semi-permanent interactive information interchange, also known as a dialogue, a conversation or a meeting, between two or more users via their respective communicating devices. Example social media sessions include a videoconference session, an audio session, a streaming video session, a text chat session, and combinations thereof. As slots in the session become available, users are selected from the waitlist. An owner of the session may determine the criteria used in selecting from among multiple users in the waitlist.

Embodiments of the present disclosure are described herein in the context of social media session access. Those of ordinary skill in the art will realize that the following detailed description of the present disclosure is illustrative only and is not intended to be in any way limiting. Other embodiments of the present disclosure will readily suggest themselves to such skilled persons having the benefit of this disclosure. Reference will now be made in detail to implementations of the present disclosure as illustrated in the accompanying drawings. The same reference indicators will be used throughout the drawings and the following detailed description to refer to the same or like parts.

High Level Functional Description

Figure 1:
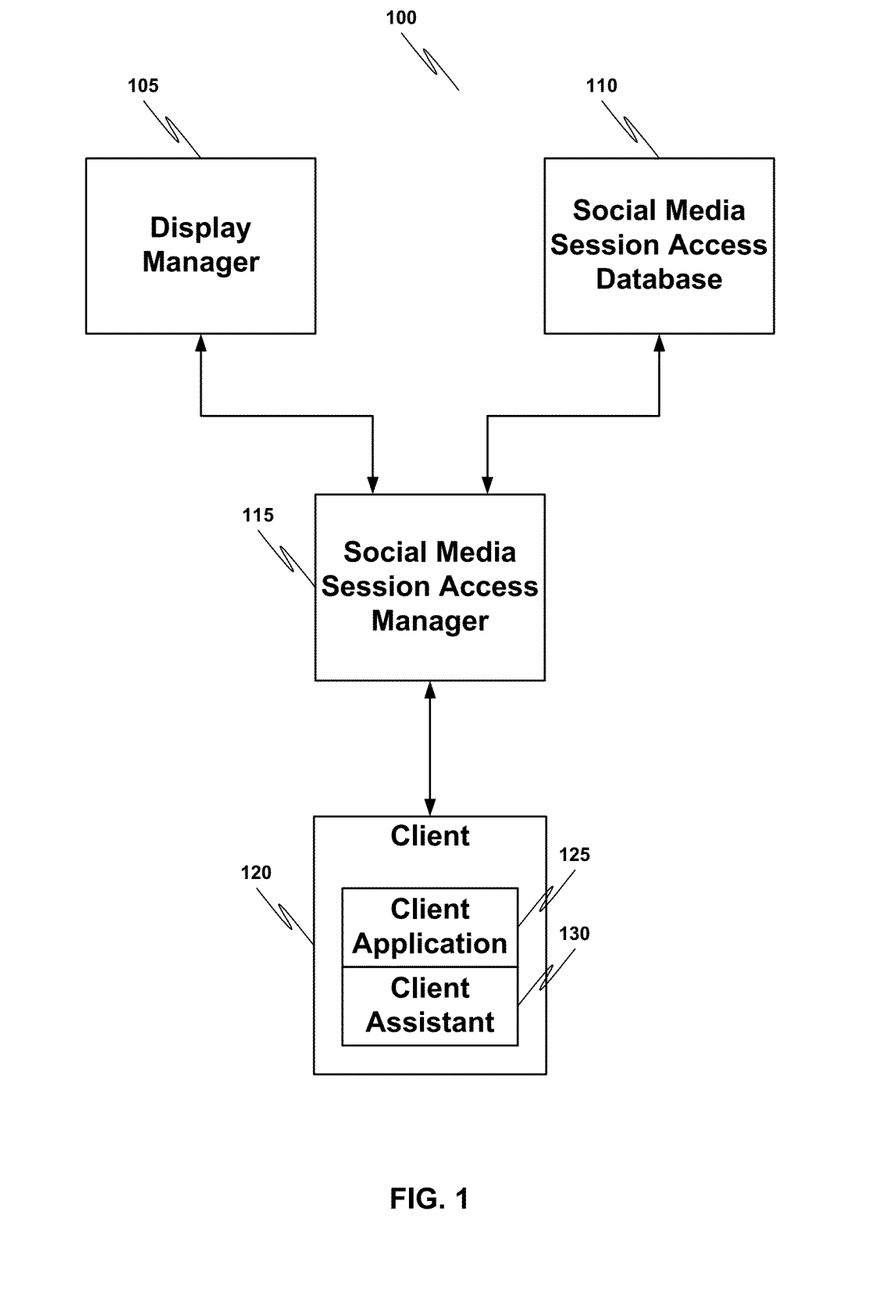
FIG. 1 illustrates a high level functional description of a system in accordance with some embodiments of the present disclosure.

FIG. 1 illustrates a high level functional description of a system 100 in accordance with some embodiments of the present disclosure. A social media session access manager 115 is connected to a client 120, a display manager 105, and a social media session access database 110. Social media session access manager 115 receives from the client 120 a request to access a social media session. Social media session access manager 115 examines information from social media session access database 110 to determine whether to grant client 120 access to the social media session, and if the determination to grant access is made, interfaces with display manager 105 to grant the client 120 access to the social media session.

Example System Description

Figure 2:
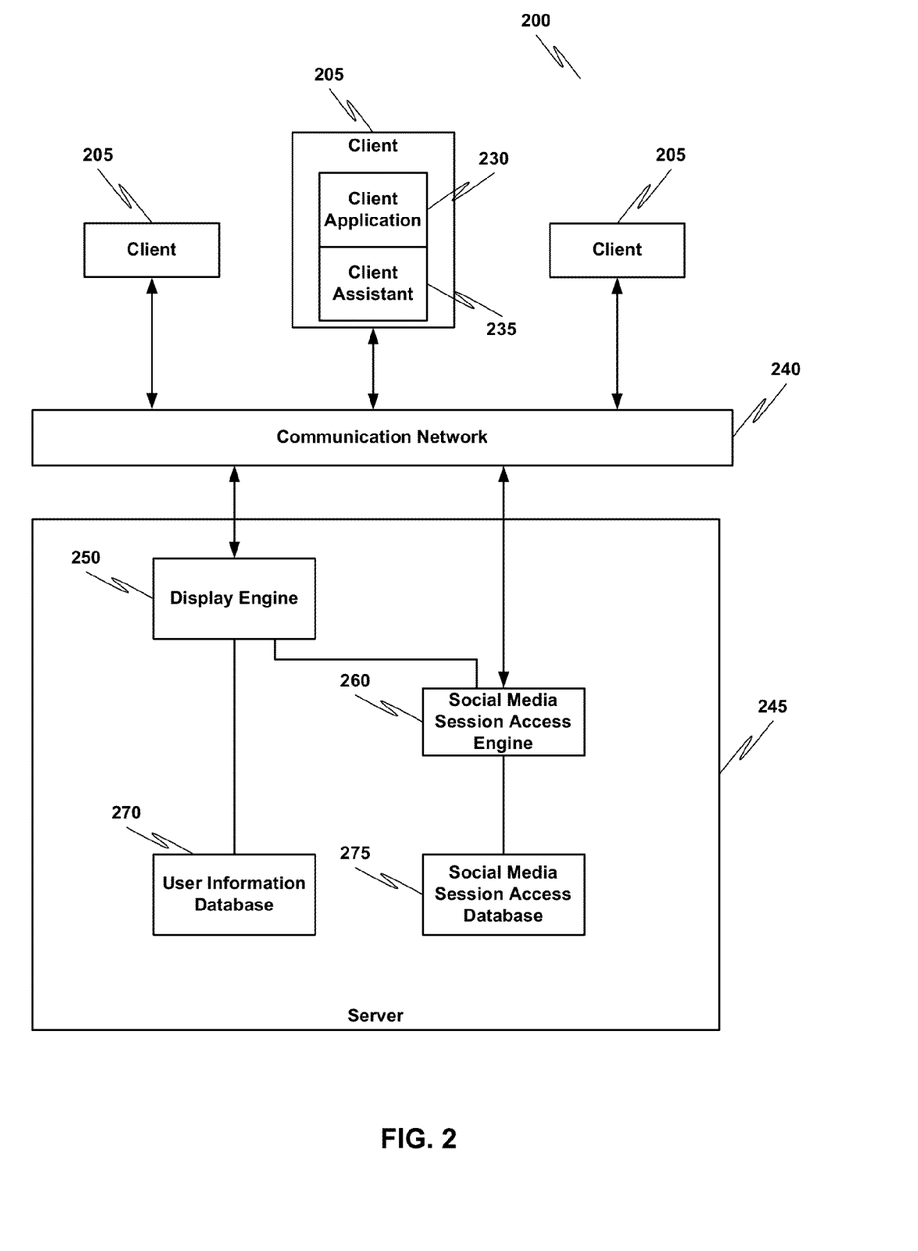
FIG. 2 depicts a block diagram of a system in accordance with some embodiments of the present disclosure.

FIG. 2 depicts a block diagram of a system in accordance with some embodiments of the present disclosure. One or more clients 205 are connected to a communication network 240. The communication network 240 is connected to a server 245. The server 245 includes a social media session access engine 260, a display engine 250, a user information database 270, and a social media session access database 275. The social media session access engine 260 is connected to the communication network 240, the display engine 250, and the social media session access database 275. The social media session access engine 260 handles requests from and responses to the client assistant 235, via its connection with communication network 240. The display engine 250 is connected to the communication network 240 and the user information database 270.

Each client 205 includes a client application 230 and a client assistant 235. The client 205 can be any number of devices (e.g., computer, internet kiosk, personal digital assistant, cell phone, gaming device, desktop computer, laptop computer, tablet computer, a television with one or more processors embedded therein or attached thereto, or a set-top box) which may be used to connect to the communication network 240. The communication network 240 may be a wireless, optical, wired or other type of network that facilitates the passage of information. It may include the Internet, one or more local area networks (LANs), one or more wide area networks (WANs), other types networks, or a combination of such networks. The client application 230 is an application that is executed by the client (e.g., browser, e-mail client, word processor) and that displays or presents information to a user of the client (the client application may also perform other tasks not relevant to the present discussion). The client assistant 235 is an application that facilitates the display or presentation of information by the client application 230. The client assistant 235 can be part of the client application 230, a plug-in to the client application 230, stand-alone application, or otherwise (e.g., a JavaScript application downloaded as part of a web page). In some embodiments, the client assistant 235, or portions of the client assistant are downloaded along with messages or other information sent to the client 205. For instance, the client assistant 235 may be one or more scripts (e.g., JavaScript programs) embedded in other content. In this way, different versions of the client assistant 235 are provided to the client 205 without requiring any explicit action by the user of the client 205. Client 205 may also include a location determiner for reporting a geolocation of the client 205.

FIG. 2 is exemplary, in some embodiments, the server 245 contains a subset of or superset of those elements illustrated in FIG. 2. Although FIG. 2 shows the server 245 as a number of discrete items, the figure is intended more as a functional description of the various features which may be present in the server 245 rather than a structural schematic of the embodiments described herein. In practice, and as recognized by those of ordinary skill in the art, items shown separately could be combined and some items could be separated. For example, some items shown separately in the figure could be implemented on a single server and single items could be implemented by one or more servers. The actual number of servers in receipt server 245 and how features are allocated among them will vary from one implementation to another, and may depend in part on the amount of traffic that the system must handle during peak usage periods as well as during average usage periods. For example, any of the user information database 270 and social media session access database 275 could be implemented as a stand-alone server or servers.

The social media session access engine 260 receives from the client 205 a request to access a social media session. Social media session access engine 260 also examines information from social media session access database 275 to determine, based on criteria set by an owner of the social media session, whether to grant client 205 access to the social media session. If the determination to grant access is made, social media session access engine 260 interfaces with display engine 250 to grant client 205 access to the social media session. The user information database 270 contains information about users associated with client devices 205, including any preferences they may have with respect to the display of items. The social media session access database 275 includes information about social media sessions, including users participating in the session, and users waiting to participate in the session.

Figure 3:
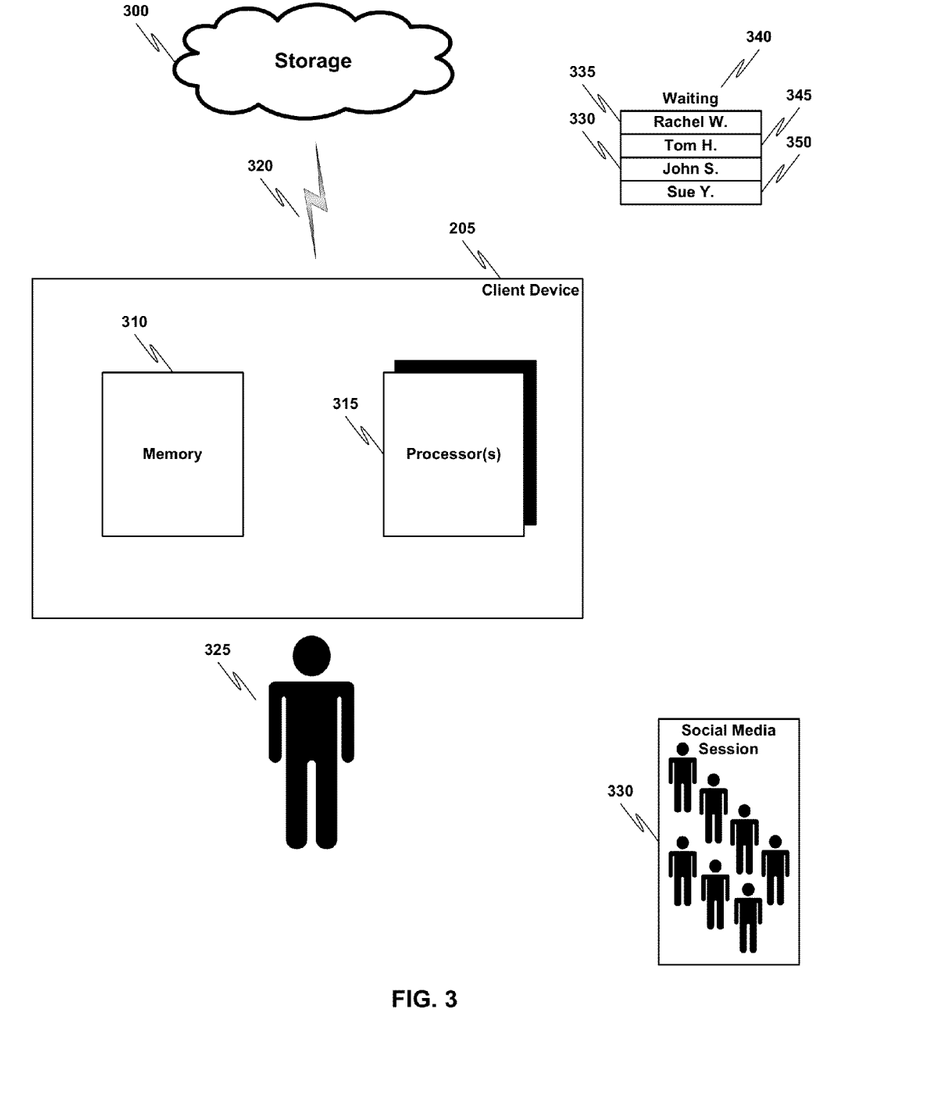
FIG. 3 depicts a block diagram of a system in accordance with some embodiments of the present disclosure.

FIG. 3 depicts a block diagram of a system in accordance with some embodiments of the present disclosure. FIG. 3 illustrates an embodiment where a client device 205 is configured to determine whether to grant access to a social media session, based at least in part on user information stored on the client device 205 or external to client device 205. As shown in FIG. 3, client device 205 includes a memory 310 and one or more processors 315. The one or more processors 315 are configured to receive a request from a user 325 to join a social media session having one or more other users 330. The one or more processors 315 are further configured to determine whether the quantity of social media session users 330 is less than a predetermined quantity of current users. The one or more processors 315 are further configured to, when the quantity of social media session users is less than a predetermined quantity of current users, grant the user access to the session. The one or more processors 315 are further configured to, when the quantity of social media session users is less than the predetermined quantity of current users, store information about the user in a list of users waiting to join the session (340). The list 340 may be stored in memory 310 or cloud 300.

Social Media Session Access Request Handling

Figure 4:
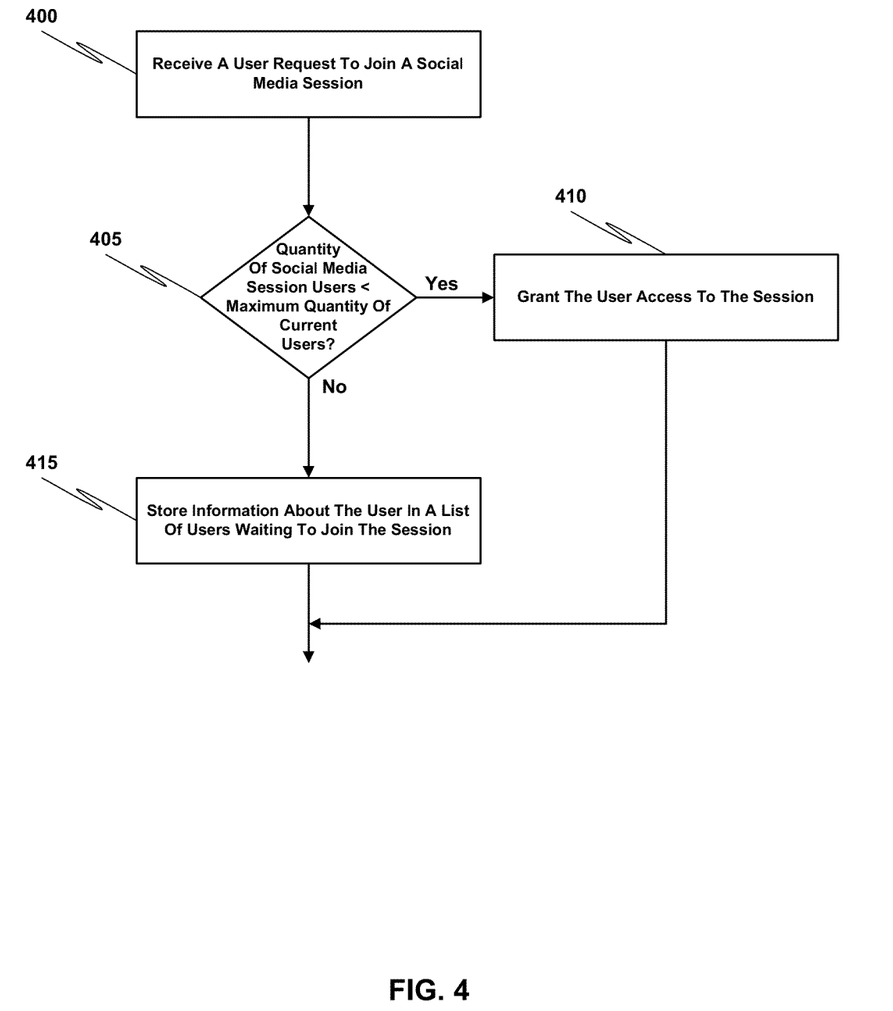
FIG. 4 depicts a process for social media session access in accordance with some embodiments of the present disclosure.

FIG. 4 depicts a process for social media session access in accordance with some embodiments of the present disclosure. At 400, a computing device receives 245 a user request to join a social media session. At 405, a determination is made regarding whether the quantity of social media session users is less than a predetermined quantity of current users. If at 405 the quantity of social media session users is less than a predetermined quantity of current users, at 410 the user is granted access to the session. If at 405 the quantity of social media session users is less than a predetermined quantity of current users, at 415 information about the user is stored in a list of users waiting to join the session. The information about the user may be used to determine whether to grant the user access to the social media session when a slot becomes available.

The social media session may be any resource limited session between two or more users. By way of example, a social media session may be a videoconference session, an audio session, a streaming video session, a text chat session, or a combination thereof.

According to one embodiment, the list of users waiting to join the session comprises a priority queue. Information about users added to the queue includes a priority value. Users associated with a higher priority value are advanced ahead of users having a lower priority value and are therefore granted access to a social media session ahead of users having a lower priority value. A priority value may be based on a determination by an owner of a social media session. A priority value may also be based on information in a profile of the user. Profiles are discussed in more detail below, with reference to FIG. 6.

According to one embodiment, the list comprises a first-in-first-out queue. Users are granted access to a social media session on a first-come-first-served basis. For example, if user A's access request is followed by user B's access request, which is followed by user C's access request, user A is offered access when a first slot becomes available, user B is offered access when a second slot becomes available, and user C is offered access when a third slot becomes available.

According to one embodiment, a position of the information in the list may be modified based at least in part on a payment of one or more credits. The credits may be in the form of an actual currency, e.g. U.S. dollars. Alternatively, the credits may be in the form of a virtual currency. For example, suppose a user is number 10 in line to join a social media session. The user may pay an owner of the session to move ahead of other users in the waitlist. According to another embodiment, a bidding process may be used to determine positions in a waitlist. For example, a highest bidder may be granted the most preferable position in line, the second-highest bidder may be granted the second-most preferable position in line, the third-highest bidder may be granted the third-most preferable position in line, and so on.

According to one embodiment, a position of the information in the list may be modified based at least in part on a determination by an owner of the session. For example, an owner of a social media session may advance a user out of turn because the owner knows the user, or the owner believes the user will contribute relatively more to the session. As a further example, an owner of a session regarding global warming may advance out of turn a user known to be an expert on global warming.

According to one embodiment, a user waiting to join a social media session is notified that the user may join the session when the session has less than a predetermined quantity of current users, and the user's position in list indicates the user may join the session. The notification may be via a text message to the user, a phone call to the user, an email to the user, or the like. The user may be given a predetermined amount of time to respond to the notification. If the user does not respond to the notification within the predetermined amount of time, the user's ability to join the session is either terminated or suspended, and another user is notified of the possibility of joining the session.

According to one embodiment, a social media session is selected from a result of searching an online directory of sessions. The online directory may be searchable by category. For example, the user may search for all sessions in a "live concert" category. The online directory may also be searchable based on membership. For example, the user may search for all sessions having one or more friends of the user as a member. According to one embodiment, the one or more friends comprises one or more friends of the user in a social network, or friends in a contact list of the user.

The online directory may also be searchable based on topic. For example, the user may search for all sessions relating to Alzheimer's disease. The online directory may also be searchable based on geolocation. For example, the user may search for all sessions associated with a geolocation that is at or near a geolocation reported by a client device associated with the user. As a further example, the user may search for all sessions at or near a geolocation specified by the user.

Selecting from a List of Users Waiting to Join a Social Media Session

Figure 5:
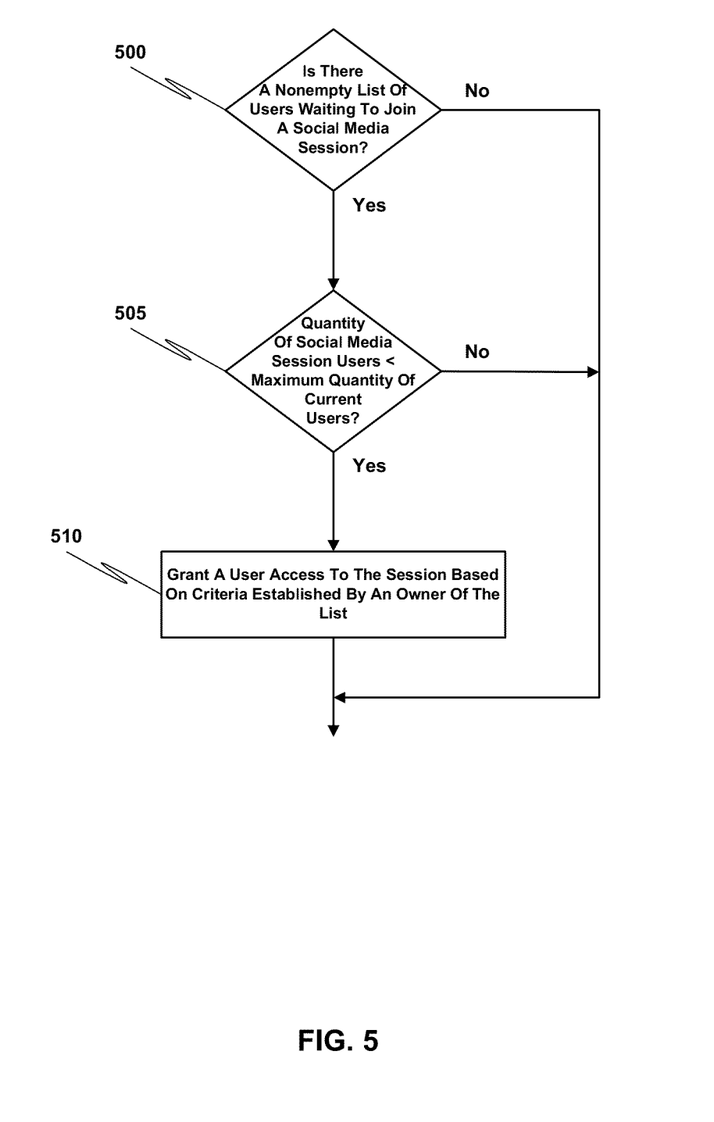
FIG. 5 depicts a process for social media session access in accordance with some embodiments of the present disclosure.

FIG. 5 depicts a process for social media session access in accordance with some embodiments of the present disclosure. At 500, a determination regarding whether there is a nonempty list of users waiting to join a social media session is made at a computing device 245. If at 500 there is a nonempty list of users waiting to join a social media session, at 505 a determination is made regarding whether the quantity of social media session users is less than a predetermined quantity of current users. If at 505 the quantity of social media session users is less than a predetermined quantity of current users, at 510 the user is granted access to the session based criteria established by an owner of the list.

Example User Profile

Figure 6:
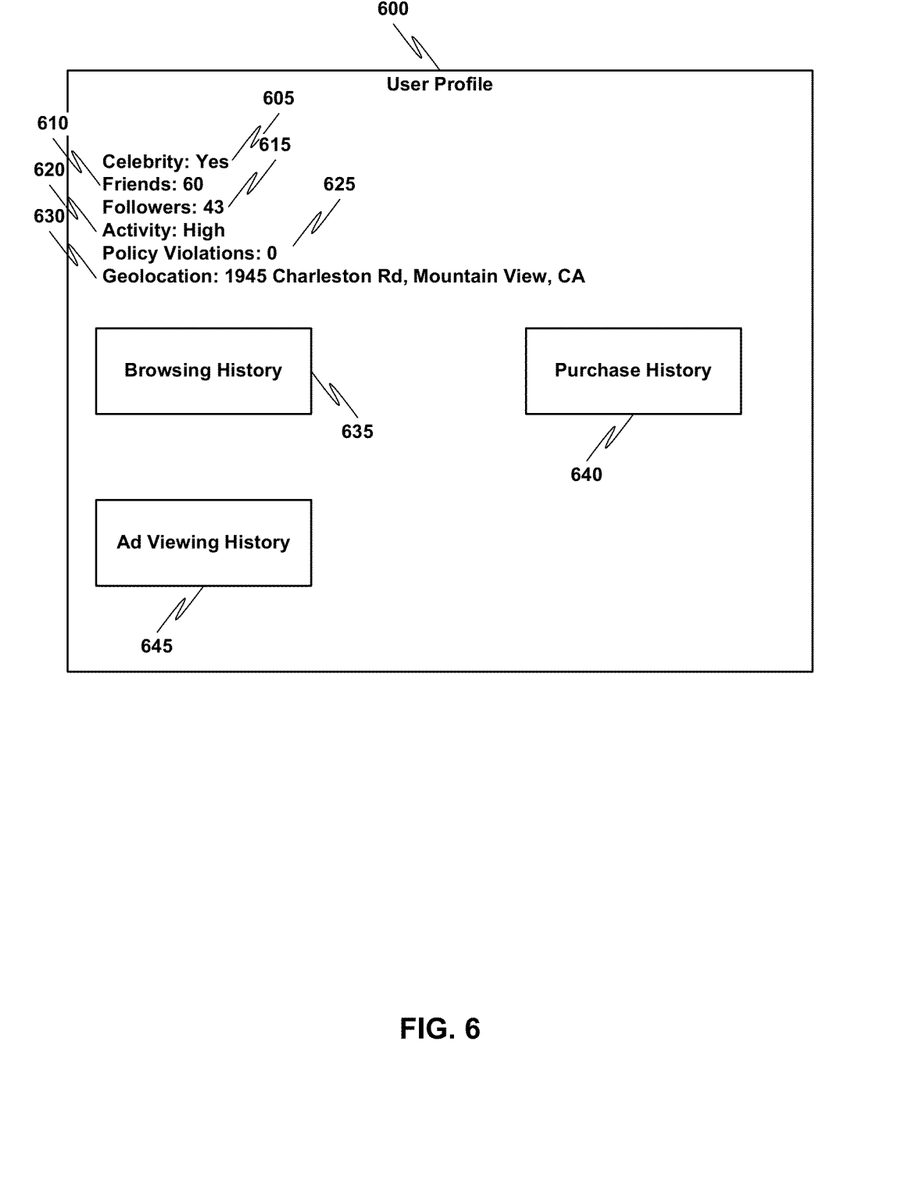
FIG. 6 depicts a user profile in accordance with some embodiments of the present disclosure.

FIG. 6 depicts a user profile in accordance with some embodiments of the present disclosure. A position of the information in a waitlist is modified based at least in part on a profile 600 of the user. A profile 600 of the user can include any information about the user. This information may include the user's online activity as well as information about the user provided by the user or collected by a third party. Users may opt out of data collection.

According to one embodiment, the profile 600 comprises a celebrity status 605 of the user. A celebrity status 605 of a user may be independent of a particular social media session. For example, a world leader or world-renowned entertainer may be granted celebrity status 605 regardless of which social media session the user joins.

Alternatively, the celebrity status 605 of a user may differ depending on which social media session the user joins. For example, a social media session regarding turmoil in a region of the world may grant celebrity status 605 to diplomatic personnel from various countries, but not to Ralph Nader or others known for their views on automotive safety. And a social media session regarding automotive safety may grant celebrity status 605 to Ralph Nader or others known in the field, but not to diplomatic personnel.

According to one embodiment, the profile 600 comprises a quantity of friends 610 of the user. Users with relatively more friends may be given preference over users with relatively fewer friends. For example, a user with 100 friends may be offered access to a social media session sooner than a user with 5 friends even though the user with 5 friends requested access to the social media session before the user with 100 friends requested access to the same session.

According to one embodiment, the profile comprises a quantity of followers 615 of the user. Users with relatively more followers 615 may be given preference over users with relatively fewer followers 615. For example, a user with 100 followers may be offered access to a social media session sooner than a user with 5 followers even though the user with 5 followers requested access to the social media session before the user with 100 followers requested access to the same session.

According to one embodiment, the profile comprises an activity level 620 of the user in the session. The activity level 620 may be with respect to prior participation in a particular social media session. The activity level 620 may also be with respect to prior or current participation in other related social media sessions. For example, a user with 100 postings in a forum related to a social media session may be offered access to the social media session sooner than a user with 5 postings to the same forum even though the user with 5 postings requested access to the social media session before the user with 100 postings requested access to the same session.

According to one embodiment, the profile comprises a quantity of policy violations 625 of the user in the session. For example, the term "flaming" is often used to describe hostile and insulting interaction between Internet users. A social media session having a policy against flaming may give preference to users having relatively fewer of such policy violations 625.

According to one embodiment, the profile comprises a geolocation 630 of the user. Users having a geolocation 630 at or near a geolocation associated with a social media session may be given preference over users having a geolocation relatively far from the geolocation associated with the social media session. For example, suppose a social media session relates to live performances of a particular band. Users having a geolocation at the venue where the band is currently performing may be given preference over users having a geolocation outside the venue.

According to one embodiment, the profile comprises a browsing history 635 of the user. Users having a browsing history 635 that indicates an interest in a particular subject may be given preference in a social media session regarding that subject. For example, suppose a social media session relates to Brazilian soccer. Users having a history 635 of browsing sites related to Brazilian soccer may be given preference over other users with relatively less history of browsing such sites.

According to one embodiment, the profile comprises a purchase history 640 of the user. Users having a history 640 of purchasing a particular product, or products from a particular vendor, may be given preference in a social media session regarding that product or vendor. For example, suppose a social media session relates to handbags made by Coach. Users having a history 640 of purchasing handbags, or other products from Coach, may be given preference over other users with relatively less history of purchasing such products.

According to one embodiment, the profile comprises an ad viewing history 645 of the user. Users having a history 645 of viewing a particular ad or a particular type of ad may be given preference over other users with respect to joining a social media session. For example, suppose a social media session relates to term life insurance. Users having a history 645 of clicking on relatively more ads regarding term life insurance may be given preference over other users having a history of clicking on relatively fewer of such ads.

Example User Interface

Figure 7:
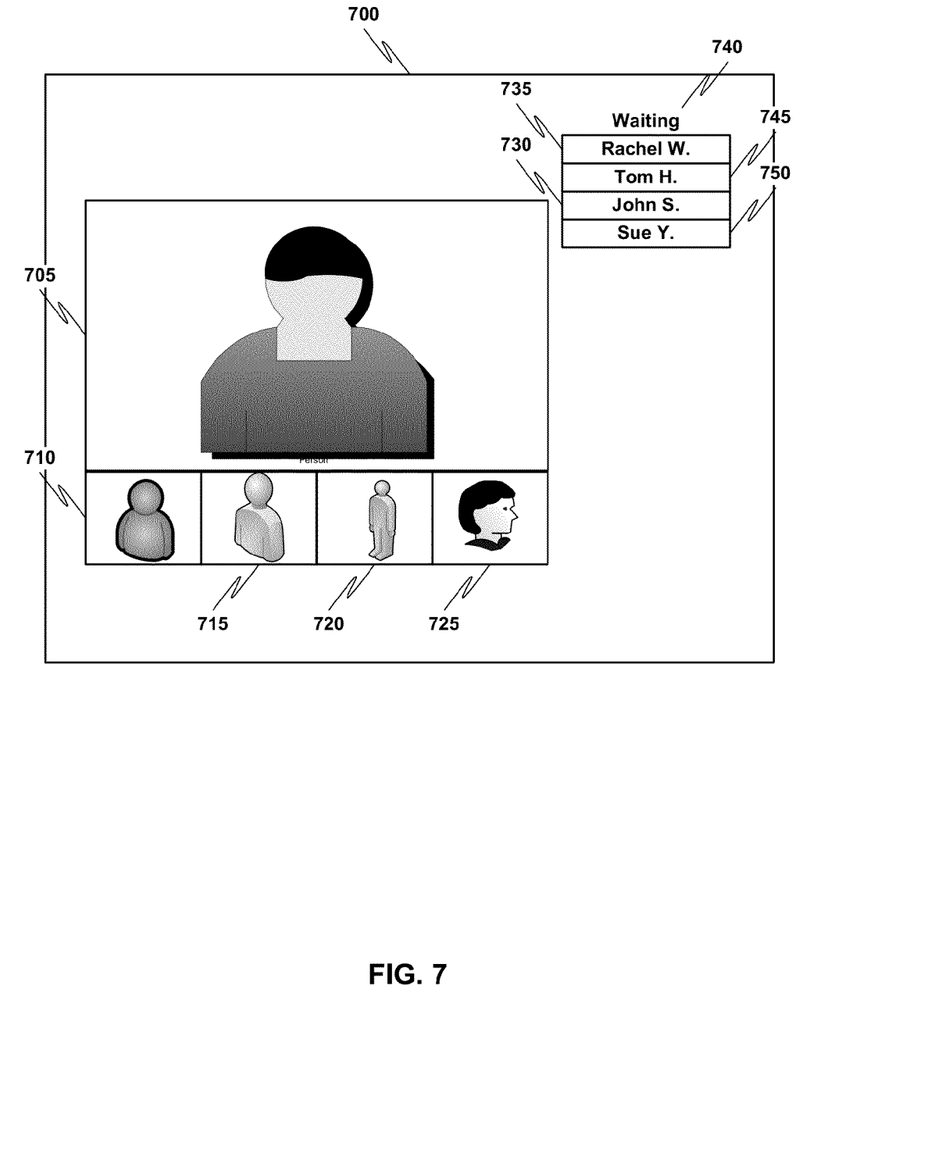
FIG. 7 depicts an exemplary social media session access display in accordance with some embodiments of the present disclosure.

FIG. 7 depicts an exemplary social media session access display in accordance with some embodiments of the present disclosure. As shown in FIG. 7, user interface 700 includes video displays of users 705, 710, 715, 720, and 725. User interface 700 optionally includes a waitlist 740 indicating which users are waiting to join the social media session. As shown in FIG. 7, users 730, 735, 745, and 750 are waiting to join the social media session. A user's position in the waitlist 740 may be used to indicate which user may join the social media session as soon as one of users 705, 710, 715, 720, and 725 leaves the social media session. According to one embodiment, waitlist 740 is viewable by only the owner of a social media session. According to another embodiment, waitlist 740 is viewable by the current participants in the social media session. According to another embodiment, waitlist 740 is viewable by users in the waitlist 740. According to another embodiment, waitlist 740 is viewable by users that are not current participants and are not in the waitlist 740. Social media session access database 275 may include a field that indicates which users may view waitlist 740.

Example Data Structures

FIG. 8 depicts a data structure for storing certain user information in accordance with some embodiments of the present disclosure. FIG. 8 illustrates an exemplary user table 800 in a user information database 270 which is used in some embodiments to store information about users. Information stored in user information database 270 may be used to determine which user is granted access to a social media session when a slot becomes available. In some embodiments, table 800 includes a plurality of records, each having a userID portion 805 and one or more other portions containing information about the user. Table 800 includes one or more records such as record 875 associated with a userID #1, and record 845 associated with a userID #U, where U represents the quantity of users with a record in user table 800. The record 875 includes one or more items of information about a user, such as the user's notification preference 810, display preference 815, wait list identifier 820, wait list position 825, online activity 830, celebrity status 835, friends 840, followers 845, policy violations 850, geolocation 855, purchase history 860, and ad viewing history 865. The notification preference 810 may indicate how the user prefers to be notified, for example which devices 205 should be notified that access to a social media session has been granted, and whether the rendering of the notification should be accompanied by an audible, tactile, or visual cue. The display preference 815 may indicate a user's preferences with regard to the display of information, and how much information about the user is disclosed to third parties. According to some embodiments, no user information is disclosed to third parties by default.

Record 875 may also include an identification (820) of social media session wait list(s) that include the user. Record 875 may also include the user's position in the list(s) identified at 825. The online activity entry 830 may indicate a user's online activity, for example which websites the user has visited. The celebrity status field 835 may indicate whether the user is considered a celebrity, and if so, what type of celebrity. The friends field 840 may indicate which other users are friends of the user in a social network. The followers field 845 may indicate which other users are following the user in a social network. The policy violations field 850 may indicate whether the user has a record of policy violations for a social network. For example, policy violations field 850 may indicate whether the user has a record of violating an anti-flaming policy. The geolocation field 855 may indicate a geoposition of a client device associated with a user. The purchase history field 850 may identify products purchased by the user. The ad view history field 865 may identify advertisements viewed by the user. The entries in any particular record 875, 880, and 885 are merely exemplary. In some embodiments, users may have differing sets of entries in their respective record.

Figure 9:
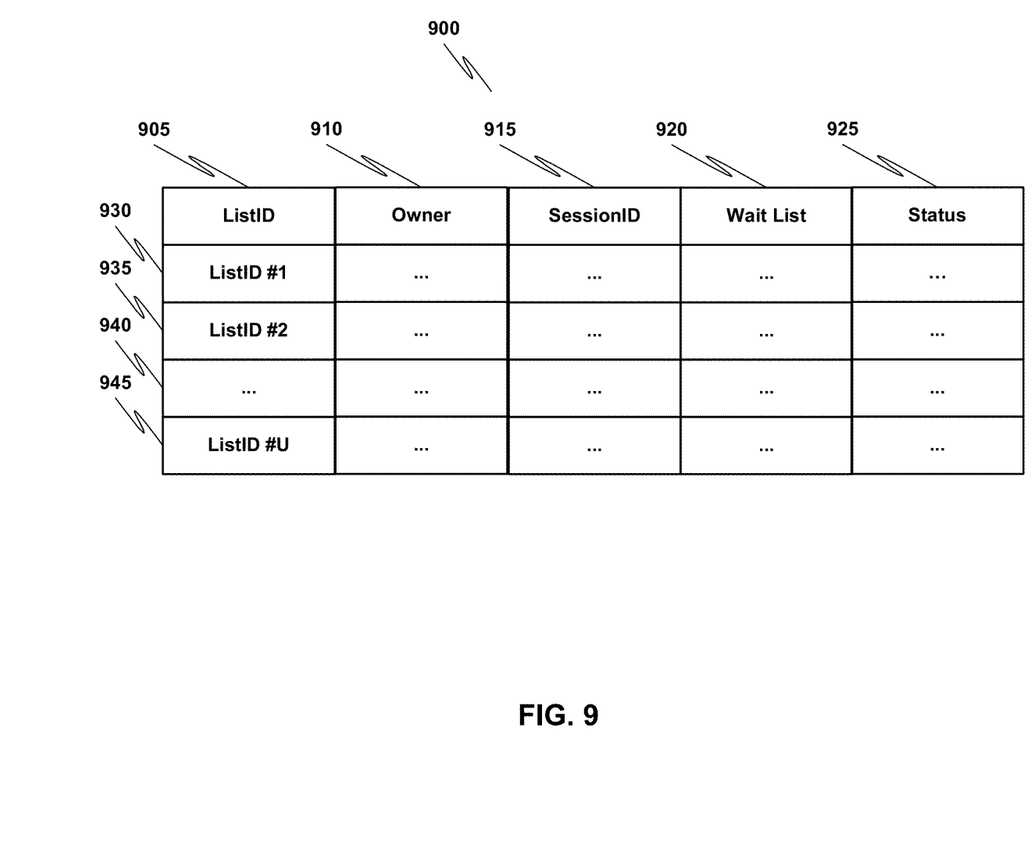
FIG. 9 depicts a data structure for storing certain social media session access information in accordance with some embodiments of the present disclosure.

FIG. 9 depicts a data structure for storing certain social media session access information in accordance with some embodiments of the present disclosure. FIG. 9 illustrates an exemplary table 900 in social media session access database 275 which is used in some embodiments to store information about social media session access. In some embodiments, table 900 includes a plurality of records, each having a ListID portion 905 and one or more other portions containing information about the list. Table 900 includes one or more records such as record 930 associated with a ListID #1, and record 945 associated with an ListID #U, where U represents the quantity of lists with a record in table 900. The record 930 includes one or more items of information about an access list, such as the owner of the list (1010), an identification of the social media session (915), a list of users waiting to join the social media session (920), and a status of the list (925). The owner of the list (910) indicates which user controls access to the session identified in field 915. The wait list 920 identifies which users are waiting to join the social media session. The status field 925 identifies a status of the list, for example whether the list is open or closed. The entries in any particular record 930, 935, 940, and 945 are merely exemplary. In some embodiments, social media access lists may have differing sets of entries in their respective record.

Additional Embodiments

Figure 10:
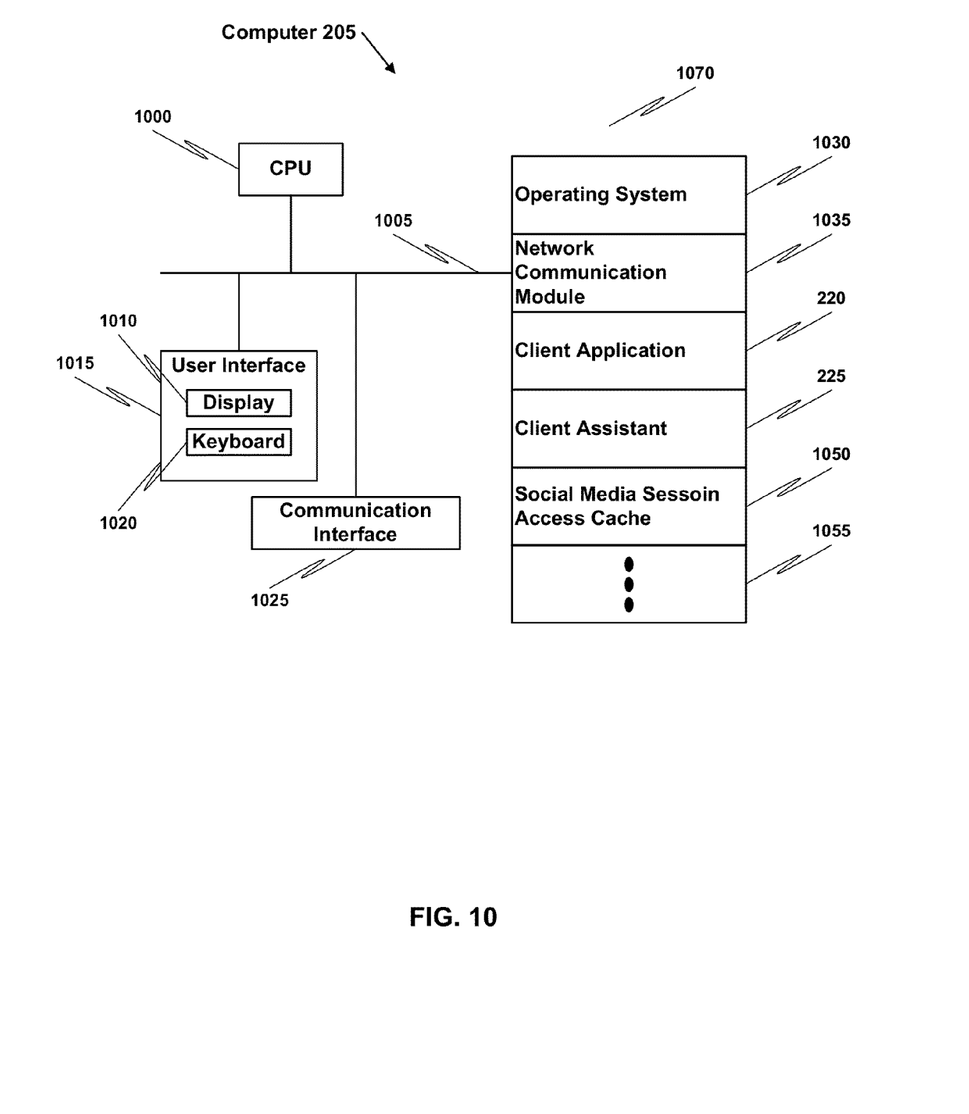
FIG. 10 depicts a client device in accordance with some embodiments of the present disclosure.

FIG. 10 depicts a client device in accordance with some embodiments of the present disclosure. A client system 205 typically includes one or more processing units (CPU's) 1000, one or more network or other communications interfaces 1025, memory 1070, and one or more communication buses 1005 for interconnecting these components. The client system 205 may include a user interface 1015, for instance a display 1010 and a keyboard 1020. The memory 1070 may include high speed random access memory and may also include non-volatile memory, such as one or more magnetic or optical storage disks. The memory 1070 may include mass storage that is remotely located from CPU's 1000. The memory 1070 may store the following elements, or a subset or superset of such elements: an operating system 1030 that includes procedures for handling various basic system services and for performing hardware dependent tasks; a network communication module (or instructions) 1035 that is used for connecting the customer client system 205 to other computers via the one or more communications interfaces 1025 (wired or wireless), such as the Internet, other wide area networks, local area networks, metropolitan area networks, and so on; a client application 220 as described above; a client assistant 235 as described above; optionally, a cache of downloaded social media access list information 1050, as well as other information for viewing using the client application 125, and information retrieved by user selection of one or more items. The client system 205 may also include a location determiner for reporting a geolocation of the client system.

Figure 11:
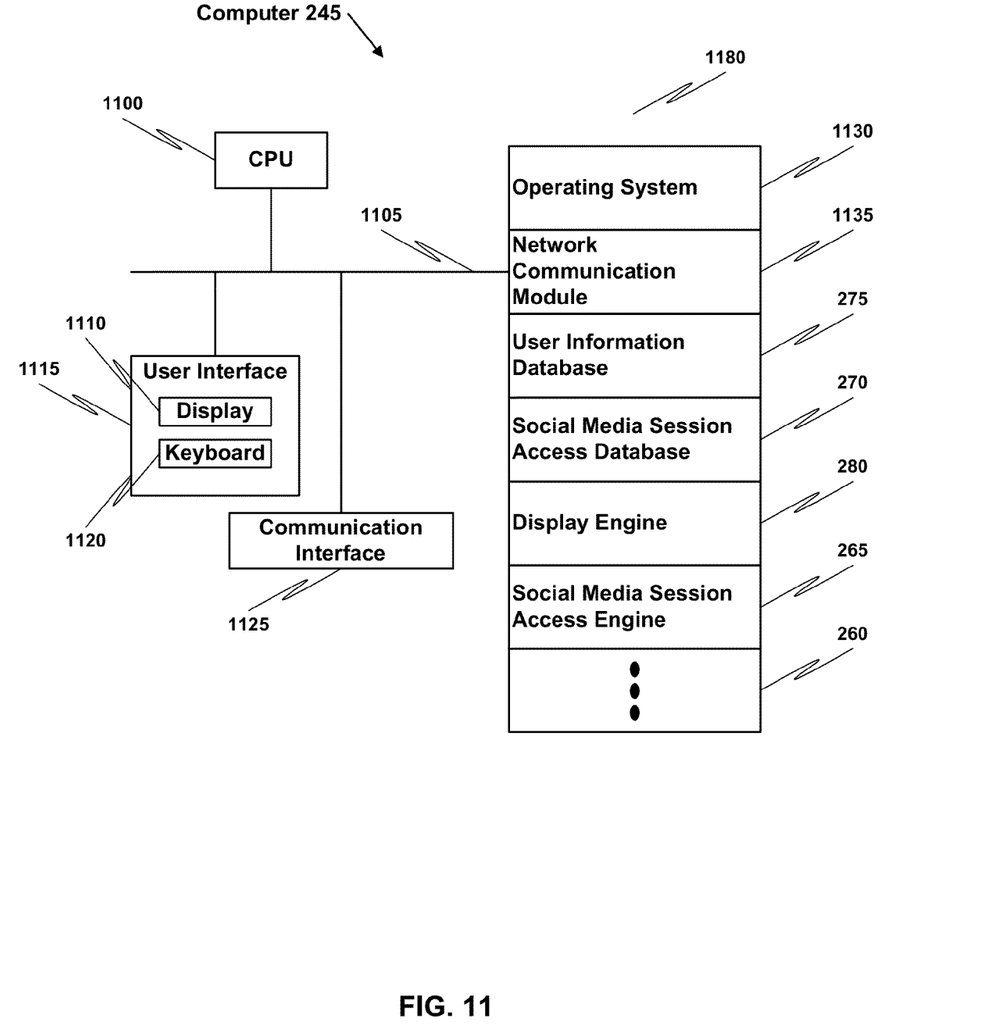
FIG. 11 depicts a server device in accordance with some embodiments of the present disclosure.

FIG. 11 depicts a server device in accordance with some embodiments of the present disclosure. A server 245 typically includes one or more processing units (CPU's) 1100, one or more network or other communications interfaces 1125, memory 1180, and one or more communication buses 1105 for interconnecting these components. The server 245 may include a user interface 1115, including a display 1110 and a keyboard 1120. The memory 1180 may include high speed random access memory and may also include non-volatile memory, such as one or more magnetic or optical storage disks. The memory 1180 may include mass storage that is remotely located from CPU's 1100. The memory 1180 may store the following elements, or a subset or superset of such elements: an operating system 1130 that includes procedures for handling various basic system services and for performing hardware dependent tasks; a network communication module (or instructions) 1135 that is used for connecting the server system 245 to other computers via the one or more communications interfaces 1125 (wired or wireless), such as the Internet, other wide area networks, local area networks, metropolitan area networks, and so on; a user information database 270 for storing user information, an social media session access database 275 for storing social media access list information, a display engine (or instructions) 250 for identifying what items to display and for formatting the items for display as described above, and an social media session access engine (or instructions) 260 for storing and displaying information regarding social media session access as described above.

Although illustrated and described in relation to client devices and server devices, it should be understood that the techniques described herein apply equally well to other types of computer networks (e.g. peer-to-peer). Furthermore, it should be understood that the techniques described herein apply equally to both wired and wireless networks. Further still, one of ordinary skill in the art will readily recognize that the techniques described herein can be applied to client applications other than applications for videoconferencing, audio sessions, video sessions, or text chat sessions.

Each of the above identified modules or programs correspond to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory 1070 or 1180 may store a subset of the modules and data structures identified above. Furthermore, memory 1070 or 1180 may store additional modules and data structures not described above.

Although some of various drawings illustrate a number of logical stages in a particular order, stages which are not order dependent may be reordered and other stages may be combined or broken out. Alternative orderings and groupings, whether described above or not, may be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, executing on one or more computing devices, for social media session access, said method comprising:
   receiving, at the one or more computing devices, a user request to join a social media session;
   when the social media session has less than a predetermined quantity of current users, granting the user access to the social media session;
   when the social media session has the predetermined quantity of current users, storing information about the user in a list of users waiting to join the social media session, wherein users are selected from the list when the social media session has less than the predetermined quantity of current users, based at least in part upon criteria set by an owner of the social media session; and
   modifying a position of the information about the user in the list based at least in part on a quantity of friends in a social network profile of the user such that a user with relatively more friends is given preference over a user with relatively fewer friends and on prior activity in past social media sessions such that a user with more postings in past sessions may be offered access to the social media session sooner than a user with fewer postings even though the user with fewer postings requested access to the social media session before the user with more postings requested access to the same session.

2. The method of claim 1, wherein the social media session comprises a video conference session.

3. The method of claim 1, wherein the social media session comprises an audio session.

4. The method of claim 1, wherein the social media session comprises a streaming video session.

5. The method of claim 1, wherein the social media session comprises a text chat session.

6. The method of claim 1, wherein the list comprises a priority queue.

7. The method of claim 1, wherein the list comprises a first-in-first-out queue.

8. The method of claim 1, further comprising:
modifying, at the one or more computing devices, a position of the information in the list based at least in part on a payment of one or more credits.

9. The method of claim 1, further comprising:
modifying, at the one or more computing devices, a position of the information in the list based at least in part on a determination by an owner of the social media session.

10. The method of claim 1, wherein the profile comprises a celebrity status of the user.

11. The method of claim 1, wherein the profile comprises a quantity of followers of the user.

12. The method of claim 1, wherein the profile comprises a quantity of policy violations of the user in the social media session.

13. The method of claim 1, wherein the profile comprises a geolocation of the user.

14. The method of claim 1, wherein the profile comprises a browsing history of the user.

15. The method of claim 1, wherein the profile comprises a purchase history of the user.

16. The method of claim 1, wherein the profile comprises an ad viewing history of the user.

17. The method of claim 1, further comprising:
after the storing, granting the user access to the social media session when:
the social media session has less than a predetermined quantity of current users; and
a position of the information about the user in the list indicates the user may join the social media session.

18. The method of claim 1, further comprising:
after the storing, at the one or more computing devices, notifying the user when:
the social media session has less than a predetermined quantity of current users; and
a position of the information about the user in the list indicates the user may join the social media session.

19. The method of claim 1, wherein the social media session is selected from a result of searching an online directory of social media sessions.

20. A computer system for social media session access, comprising:
one or more processors; and
memory to store:
one or more programs, the one or more programs, when executed on the one or more processors, performing the method comprising:
receive, at the computer system, a user request to join a social media session;
when the social media session has less than a predetermined quantity of current users, grant, at the computer system, the user access to the social media session;
when the social media session has the predetermined quantity of current users, store, at the computer system, information about the user in a list of users waiting to join the social media session,
wherein users are selected from the list when the social media session has less than the predetermined quantity of current users, based at least in part upon criteria set by an owner of the social media session; and
modifying a position of the information about the user in the list based at least in part on a quantity of friends in a social network profile of the user such that a user with relatively more friends is given preference over a user with relatively fewer friends and on prior activity in past social media sessions such that a user with more postings in past sessions may be offered access to the social media session sooner than a user with fewer postings even though the user with fewer postings requested access to the social media session before the user with more postings requested access to the same session.

21. A non-transitory computer readable storage medium storing one or more programs configured to be executed by one or more computing devices, said programs, when executing on the one or more computing devices, performing the method of:
receiving, at the one or more computing devices, a user request to join a social media session;
when the social media session has less than a predetermined quantity of current users, granting the user access to the social media session;
when the social media session has the predetermined quantity of current users, storing information about the user in a list of users waiting to join the social media session,
wherein users are selected from the list when the social media session has less than the predetermined quantity of current users, based at least in part upon criteria set by an owner of the social media session; and
modifying a position of the information about the user in the list based at least in part on a quantity of friends in a social network profile of the user such that a user with relatively more friends is given preference over a user with relatively fewer friends and on prior activity in past social media sessions such that a user with more postings in past sessions may be offered access to the social media session sooner than a user with fewer postings even though the user with fewer postings requested access to the social media session before the user with more postings requested access to the same session.

* * * * *